May 5, 1964  M. W. HAZELTON ETAL  3,131,589
LEVELING AND RAKE CONTROL FOR HYDRAULIC SHEAR
Filed Feb. 6, 1961  3 Sheets-Sheet 1

INVENTOR.
MERRILL W. HAZELTON AND
BY RICHARD E. GRIESHEIMER,

ATTORNEYS.

May 5, 1964

M. W. HAZELTON ETAL 3,131,589

LEVELING AND RAKE CONTROL FOR HYDRAULIC SHEAR

Filed Feb. 6, 1961

INVENTOR.
MERRILL W. HAZELTON AND
BY RICHARD E. GRIESHEIMER,

ATTORNEYS.

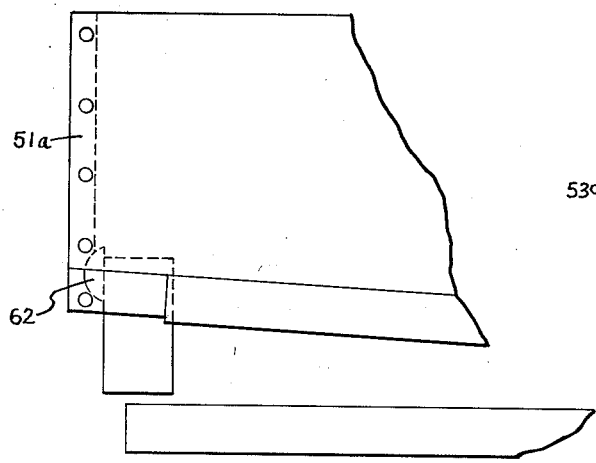
FIG. 6.
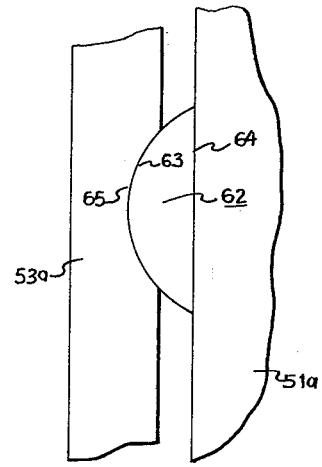
FIG. 7
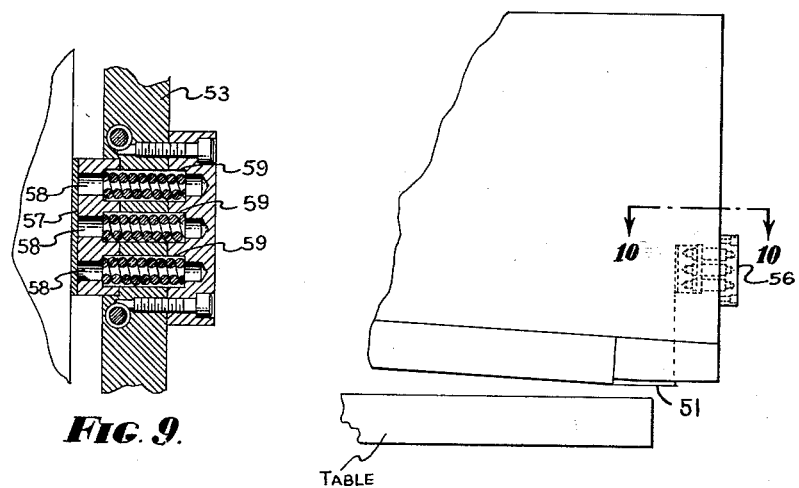
FIG. 9.
FIG. 8.
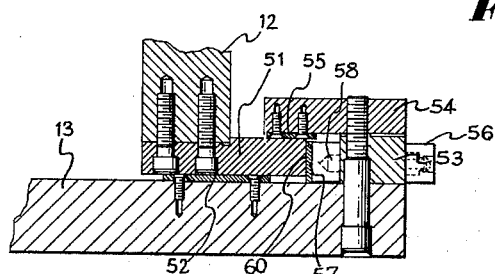
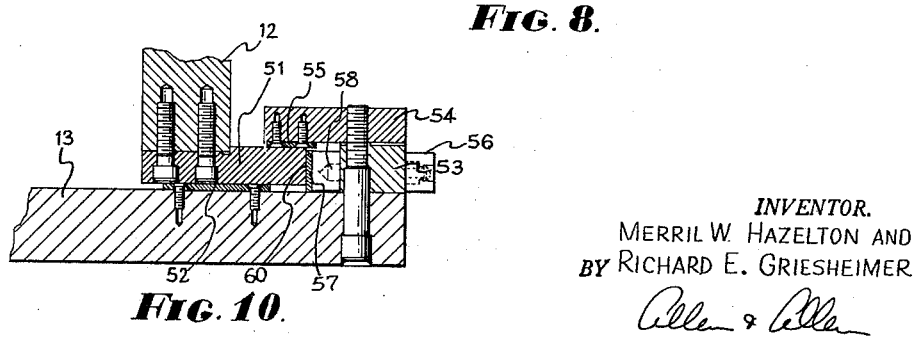
FIG. 10.
INVENTOR.
MERRIL W. HAZELTON AND
BY RICHARD E. GRIESHEIMER
ATTORNEYS

United States Patent Office 3,131,589
Patented May 5, 1964

3,131,589
LEVELING AND RAKE CONTROL FOR
HYDRAULIC SHEAR
Merrill W. Hazelton and Richard E. Griesheimer, Cincinnati, Ohio, assignors to The Cincinnati Shaper Company, Cincinnati, Ohio, a corporation of Ohio
Filed Feb. 6, 1961, Ser. No. 87,459
8 Claims. (Cl. 83—635)

This invention relates to a leveling and rake control for hydraulic shears and the like. In shearing metal sheets and plates, it is necessary that the knife descend at an angle to the table to produce an effect similar to a pair of scissors. The angle of rake is often of the greatest importance. Thus, the heavier the plate to be sheared, the greater must be the angle of rake. However, the greater the angle of rake, the more distortion of the piece which is cut off is produced. Therefore, in order to shear a sheet or plate a certain minimum rake is required but at the same time it is desirable not exceed the minimum rake too greatly because of the concomitant distortion which is produced.

Thus, it is necessary in a shear which is to be used for a variety of work to provide means for adjusting the rake of the knife and to maintain the adjusted angle of rake in a desired position of adjustment.

There are various devices now on the market for accomplishing the above purposes but these devices generally involve the use of a band and rollers, all of which have a tendency to introduce errors and all of which constitute apparatus elements liable to get out of adjustment or malfunction for one reason or another.

With the foregoing considerations in mind, it is an object of the present invention to provide a leveling and rake control which is very much simpler than any system involving the use of leveling bands and rollers. It is also an object of the present invention to provide a device as above outlined which eliminates the need for additional limit switches to protect the mechanism against excessive rake adjustment. Still another object is to provide a device as above outlined which is hydraulically operated and which does not require a separate hydraulic circuit for changing the rake.

These and other objects of the invention which will be described in more detail hereinafter or which will become apparent to one skilled in the art upon reading these specifications, we accomplish by that certain construction and arrangement of parts of which we shall now disclose an exemplary embodiment.

Reference is made to the drawings forming a part hereof and in which:

FIGURE 1 is a diagrammatic representation of a hydraulic circuit showing how the rake and level control are tied in.

FIGURE 6 is a diagrammatic view of the left end of the ram.

FIGURE 7 is an enlarged view of the end thrust shoe shown in FIGURE 6.

FIGURE 8 is a fragmentary diagrammatic view of the right hand end of the ram.

FIGURE 9 is a fragmentary enlarged view of the take-up shoe shown in FIGURE 8.

FIGURE 10 is a fragmentary cross-sectional view on an enlarged scale taken on the line 10—10 of FIGURE 8.

Figure 1:
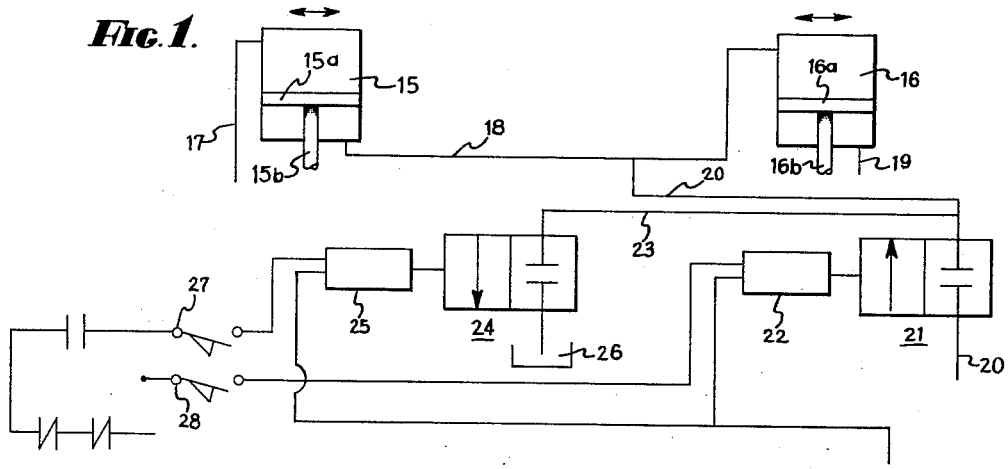

Briefly, in the practice of our invention we provide a shear having a frame and a table secured to said frame. As is well known in the art, the frame is provided with side plates which carry guides for a ram. A ram extends between the side plates and is guided in its up and down movement by the guides. In a hydraulic shear, the ram is caused to move up and down by pistons operating in hydraulic cylinders, one at each end of the ram, the pistons respectively being connected to the two ends of the ram. Thus, by the action of hydraulic fluid on the pistons in the two cylinders the ram is caused to move down or up under the control of valves as is well known.

In order to achieve the objects of the present invention we connect the two cylinders in tandem, i.e. hydraulic fluid under pressure is led to the top of one cylinder and the exhaust from said cylinder below the piston is led into the top of the other cylinder above the piston. Thus, there is a tandem connection from beneath the piston in one cylinder to above the piston in the other cylinder. A supply line is connected into this tandem connection as well as a bleed line. The supply and bleed lines are under the control of suitable valves which are preferably solenoid operated. Thus, assuming the ram to be in its lowermost position and with no rake, if hydraulic fluid under pressure is supplied into the tandem connecting line, it will be seen that this additional fluid will act on the top of one piston (which is already in its lowermost position) and beneath the other piston whereby said other piston is caused to rise, carrying with it that end of the ram to which it is connected. By controlling the supply of fluid into the tandem connecting line, the degree of rake can be adjusted as desired.

If it is desired to reduce a rake which is already in the knife, if hydraulic fluid is bled from the tandem connecting line, it will be clear that the higher piston can descend carrying with it that end of the ram which is connected to it.

Considering for a moment the geometry of a rake adjustment of the shear, the ram may be considered as pivoting about a fixed point located near for example, its lower left edge. The pistons of the hydraulic cylinders described above are connected respectively to the left and right upper edges of the ram. Therefore, lines drawn from the fixed pivot point to the points of connection between the hydraulic pistons and the ram may be considered as radii of circles having their centers near the lower left hand edge of the ram; thus, as the ram is pivoted about this pivot point, the imaginary radii describe arcuate paths each having a horizontal and a vertical component. The vertical component is accommodated by relative movement between the hydraulic cylinder and its piston, but since the piston is constrained horizontally within its respective cylinder, the horizontal movement of each piston is transmitted to its respective cylinder, which then moves in a horizontal path parallel to the ram.

On a fixed part of the machine we provide a pair of microswitches which are spaced apart and mounted on a yieldable mounting and the position of the mounting is made adjustable parallel to the ram length. An element rigidly secured to the horizontally movable cylinder enters between the microswitches with a small amount of clearance so that as the rake changes slightly and the said cylinder moves horizontally a small amount, it will actuate one or the other of the microswitches which are connected respectively to the solenoids which actuate the supply and bleed valves to the tandem connecting line.

If it is desired to change the rake of the knife, the mounting for the microswitches is bodily moved in one direction or the other whereupon contact is made with one of the microswitches and this contact is maintained until the rake has been changed to the desired degree that the element rigidly secured to the movable cylinder permits the resilient mounting of the microswitches to return to its original position, whereupon the microswitch will be opened. In this way the horizontal position of the movable cylinder determines the rake of the knife.

Figure 2:
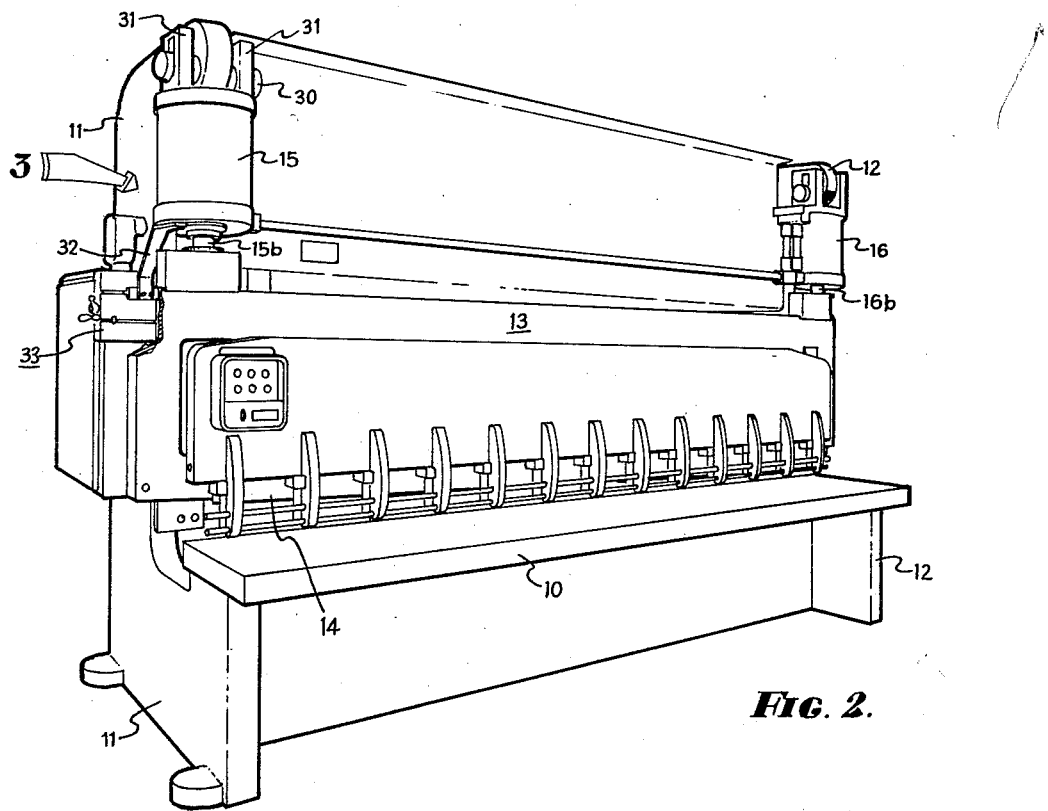
FIGURE 2 is a perspective view of the front of a typical shear showing the over-all relationship of the various parts.

Referring now more particularly to the drawings and specifically to FIGURE 2, the shear has the table 10 and the side plates 11 and 12. The ram is indicated at 13 and carries the knife 14. Hydraulic cylinders 15 and 16 are mounted on the side plates 11 and 12 respectively and have pistons which are connected to the ends of the ram 13.

Referring now to the diagram of FIGURE 1, it will be seen that the cylinder 15 has a piston 15a and the cylinder 16 has a piston 16a. The rod 15b of the piston 15a is connected to the left end of the ram while the rod 16b of the piston 16a is connected to the right-hand end of the ram. A line 17 for hydraulic fluid enters the top of the cylinder 15 and a tandem connecting line 18 connects from the lower end of the cylinder 15 to the upper end of the cylinder 16. A line 19 connects to the lower end of the cylinder 16. When it is desired to raise the ram, hydraulic fluid under pressure is forced through the line 19 raising the piston 16a and the hydraulic fluid displaced by the piston 16a passes through the line 18 and raises the piston 15a. When it is desired to cause the ram to descend, hydraulic fluid is forced through the line 17 forcing the piston 15a downward and the fluid displaced by the piston 15a passes through the line 18 to the top of the cylinder 16 forcing the piston 16a down. As will be understood, the area of the piston 16a is less than the area of the piston 15a by the area of the piston rod 15b.

According to our invention, a line 20 enters the line 18 and hydraulic fluid under pressure may be caused to pass through the line 20 into the line 18 through the solenoid operated valve 21. A line 20 to which hydraulic fluid is forced by conventional means (not shown), can pass through the valve 21 when it is shifted to the right by means of its solenoid 22. With the valve 21 in the position shown, no fluid can pass through the valve 21.

A bleed line 23 also communicates with the line 20 and leads to a valve 24 which is closed in the position shown. However, when the solenoid 25 is actuated, the valve 24 shifts to the right and fluid can now be bled from the line 18 through the lines 20 and 23 and the valve 24 to the sump 26.

At 27 and 28 there are indicated the spaced microswitches and it will be seen that actuation of the switch 27 operates the solenoid 25 and consequently the valve 24 while operation of the microswitch 28 operates the solenoid 22 and consequently the valve 21.

It will be understood that in FIGURE 1 only so much of the hydraulic and electrical circuit are shown as are necessary to an understanding of the present invention. The balance of both the electrical and hydraulic circuits may be conventional and do not constitute a part of the present invention.

It will be observed in FIGURE 2 that the cylinder 15 is mounted to the side plate 11 by means of a heavy pin 30 passing through ears 31 on the cylinder 15 and through a bore in the side plate 11. It will also be observed in this figure that a substantial clearance between the side plate 11 and the ears 31 is provided so that the cylinder 15 may move horizontally axially of the pin 30. FIGURE 2 also shows a bracket 32 secured to the cylinder 15 which, as will be described hereinafter, operates the microswitches 27 and 28.

Figure 5:
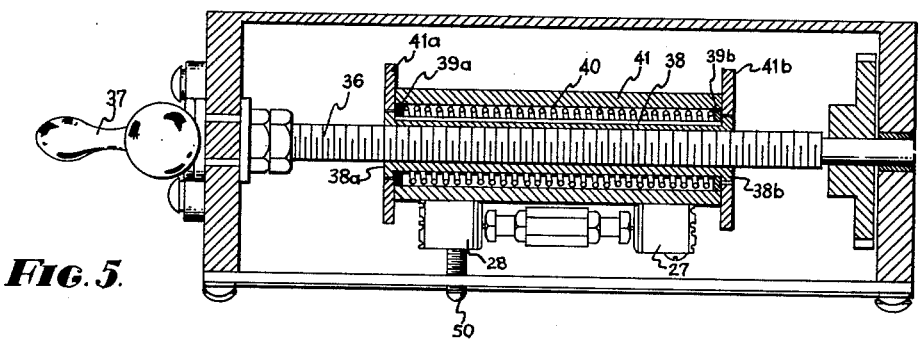
FIGURE 5 is a cross-sectional view of the same taken on the line 5—5 of FIGURE 4.
Figure 4:
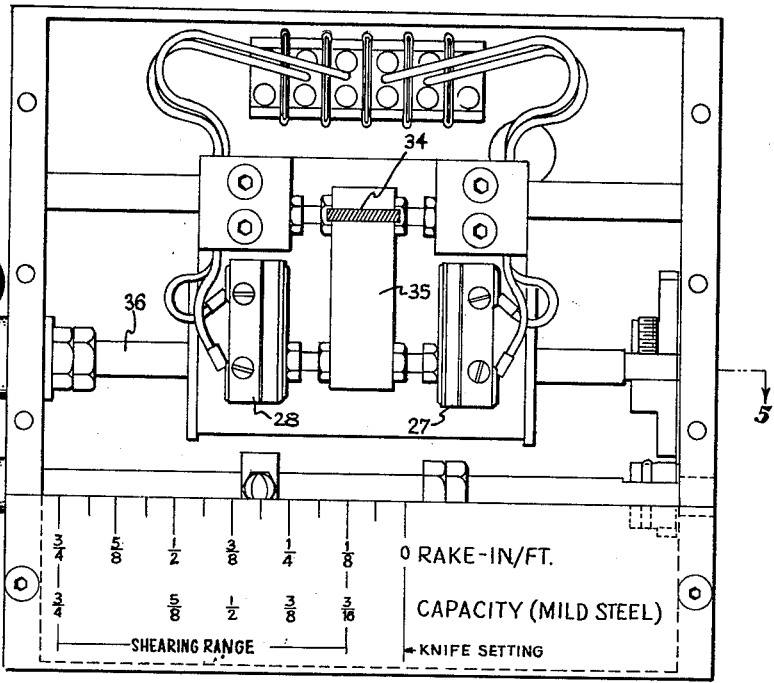
FIGURE 4 is a front elevational view taken under the cover of the control box shown in FIGURE 3 on an enlarged scale.
Figure 3:
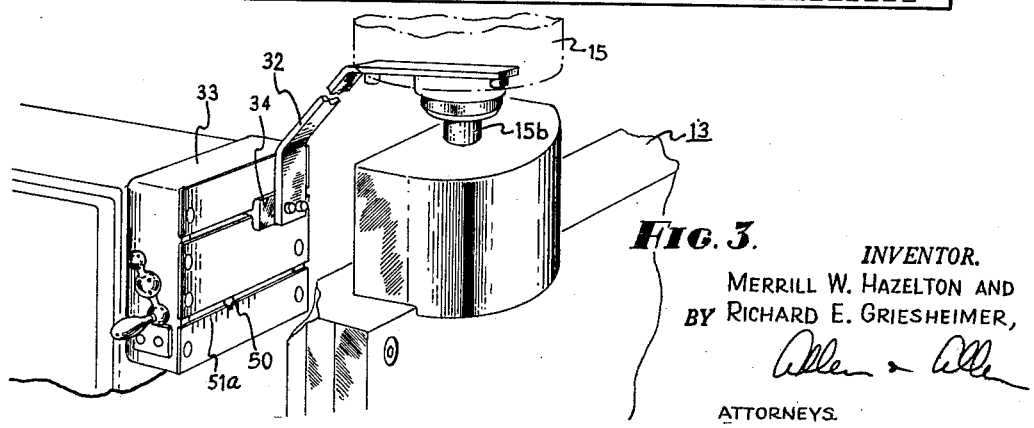
FIGURE 3 is a fragmentary perspective view taken generally in the direction of the arrow 3 in FIGURE 2.

Mounted on the side plate of the shear is a control box indicated generally at 33. Within this control box, which is shown in more detail in FIGURES 4 and 5, are mounted the microswitches 27 and 28. Secured to the bracket 32 is a member 34 which enters through the cover plate of the control box 33 and has secured to it a member 35 which extends between the microswitches 27 and 28 with small clearance. It will be clear that if the cylinder 15 moves in one direction or the other in its horizontal path, it carries with it the members 32, 34 and 35, so that one or the other of the microswitches 27 and 28 will be actuated to either supply fluid to the line 18 or to bleed fluid therefrom, as heretofore described, to maintain the proper relationship between the pistons 15a and 16a. As long as these pistons remain in their proper relationship for a given rake, the mechanism of the present invention does not operate. If the rake varies slightly, however, as a result of which the cylinder 15 moved in one direction or the other, then the appropriate microswitch 27 or 28 is actuated to restore the rake to its previous value.

The microswitches 27 and 28 are mounted yieldably with respect to a lead screw 36 provided with an operating handle 37. The lead screw 36 has mounted upon it in threaded engagement therewith, a sleeve 38 and it will be clear that as the handle 37 is turned in one direction or the other, the sleeve 38 is caused to move in one direction or the other. The sleeve 38 is provided with the flanges 38a and 38b. At each end there is a washer indicated respectively at 39a and 39b between which a compression spring 40 is disposed and the spring 40 is seated within an outer sleeve 41 having the flanges 41a and 41b.

If now the handle 37 is rotated to cause the sleeve 38 to move toward the right in FIGURE 5 for example, the switches 27 and 28 will be essentially carried to the right until the switch 28 abuts the member 35 and is actuated. Thereafter, the assembly of the switches 27, 28 can no longer move to the right although the handle 37 may be further rotated with the inner sleeve 38 actuated on the washer 39a, compressing the spring 40 against the washer 39b which is retained by the flange 41b of the sleeve 41. When the hand wheel 37 has been rotated to the desired position, remembering that the microswitch 28 is closed, the feeding of the line 18 continues while the rake becomes higher and higher as a result of which the cylinder 15 moves along its pin axis 30 and as it moves, the spring 40 urges the sleeve 41 back toward its original position. This action continues until the sleeve 41 has returned to its normal position with respect to the sleeve 38, whereupon a minute further movement of the cylinder 15 causes the microswitch 28 to open. At this point, then, the mechanism stops and the rake has been adjusted to a new value. It will be understood that if the handle 37 is turned in the opposite direction, the same sequence of operations takes place but in a reverse direction.

The microswitch assembly carries a pointer 50 which projects through the front of the apparatus and which cooperates with a suitably calibrated scale 50a. The scale 50a is preferably calibrated in terms of rake designated as inches per foot.

FIGURES 6 and 8 show in a general way how there is horizontal movement of the cylinder 15 when the rake is changed. Both the horizontal and vertical edges of the ram (to be exact, imaginary lines drawn from the pivot point of the ram to the points of attachment between the pistons of the hydraulic cylinders 15 and 16 and the ram) may be considered as radii of circles having their centers at the lower left-hand end of the ram; and if the rake of the ram moves from zero to its maximum value, it will be seen that the horizontal projection of the end of the horizontal and vertical edges of the ram are moved horizontally and therefore the cylinder 15 which is connected to the left-hand end of the ram through its piston 15b moves toward the right. As rake is reduced, this cylinder moves toward the left.

In FIGURE 10, the side plate 12 and ram 13 are shown in cross-section. In this figure also the guide 51 is clearly shown. The ram 13 is provided with the bronze plate 52 which slides against the front face of the guide 51. The ram at its end is provided with a spacer 53 and a clamp 54. The clamp 54 is provider with the bronze facing 55 which bears against the rear face of the guide 51. The spacer carries the shoes for taking the end thrust on the ram. At the right hand end, as seen in FIGURE 8, the spacer 53 carries the end thrust shoe indicated generally at 56 and shown in more detail in FIGURE 9. The end thrust shoe comprises a bronze plate 57 acted upon by a number of plungers 58 under the influence of springs seated in the holes 59 in the spacer 53. In this way, the bronze shoe 57 can pivot slightly so that as the ram rake is changed, the shoe 57 can maintain operative guiding relationship with the end surface 60 of the guide 51.

At the left-hand end of the ram, we provide a rockable end thrust shoe 62 shown in enlargement in FIGURE 7, and this shoe has a part-circular face 63 and a flat face 64. The part-circular face 63 is seated in the part-circular groove 65 in the spacer 53a at the left-hand end of the shear. It will be understood that at the left-hand end of the shear, the construction is a mirror image of that shown in FIGURE 10, except that in place of the end thrust shoe 56 we provide the rockable shoe 62. As shown in FIGURE 6, this shoe may rock to maintain operative guiding relationship with the corresponding guide 51a at the left-hand end of the shear.

It will be seen that the invention disclosed herein requires no separate hydraulic system but requires only two valves and associated solenoids and switches and two additional hydraulic lines. Because of the construction of the control apparatus described in connection with the control box 33, there is no need for extra limit switches to prevent excessive out-of-level condition or excessive rake. The two microswitches described handle the situation completely.

It will be understood that numerous modifications may be made without departing from the spirit of the invention and we, therefore, do not intend to limit ourselves except as set forth in the claims which follow.

Having now fully described our invention, what we claim as new and desire to secure by Letters Patent is:

1. In a shear having a frame, a table secured to said frame, said frame comprising side plates having guides for a ram, a ram guided by said guides, a knife secured to said ram, a hydraulic cylinder mounted on each side plate and each having a piston secured to said ram to actuate the same; a hydraulic circuit including said cylinders in tandem hydraulic relation, means for supplying hydraulic fluid under pressure to, and bleeding hydraulic fluid from, the tandem connection between said cylinders, to cause the piston of one of said cylinders to occupy a different vertical position than the other, said one cylinder being mounted for free sliding horizontal movement with respect to said one of said side plates, whereby as the rake of said knife is changed said one cylinder moves horizontally with respect to said one of said side plates, and means for controlling the said supplying and bleeding of hydraulic fluid in response to the position, in its horizontal path of movement, of said one cylinder.

2. The structure of claim 1, wherein means are provided to move said controlling means to produce a supplying and bleeding of hydraulic fluid, whereby to cause said one cylinder to move in its horizontal path to change the rake of said knife.

3. The structure of claim 1, wherein the supply line for hydraulic fluid to said tandem connection is provided with a normally closed, solenoid openable valve, and wherein a drain line from said connection is provided with a normally closed, solenoid openable valve, an electric circuit for each of said solenoids, each said circuit including switch means, said switch means being spaced apart a fixed distance, and a member secured to said one cylinder and extending between said switch means to actuate one of said switch means upon horizontal movement of said cylinder in one direction and the other of said switch means upon horizontal movement of said cylinder in the other direction, whereby to maintain the horizontal position of said one cylinder, and therefore the rake of said knife.

4. The structure of claim 3, including a mounting means for said spaced switch means, wherein spring means are provided to hold said switch means in a normal position with respect to said mounting means, said mounting means being movable to various positions of adjustment, whereby one of said switch means is closed and the rake of said knife is changed until said member secured to said one cylinder returns said switch means to said normal position with respect to said mounting means.

5. The structure of claim 4, wherein a pointer is associated with said member secured to said one cylinder and a scale is provided in juxtaposition to said pointer, said scale indicating the horizontal position of said one cylinder, and being calibrated in terms of rake of said knife.

6. The structure of claim 1, wherein the ram is provided, at the end adjacent said one cylinder, with a rockable end thrust shoe in slidable contact with one of said guides, and at the other end with a spring urged take-up shoe in slidable contact with another of said guides, whereby an operative guiding relationship is maintained between said ram and guide irrespective of the rake of said ram.

7. The structure of claim 6, wherein said rockable end thrust shoe comprises a segment having a part-circular face and a flat face, said ram having a part-circular groove in which said segment is rockably seated, the flat face of said segment being in guiding contact with said one guide.

8. The structure of claim 6, wherein said take-up shoe comprises a flat balancing member, and a plurality of spring means disposed normal to and along said balancing member in said ram, whereby operative guiding contact is maintained between said member and said ram irrespective of the rake of said ram.

References Cited in the file of this patent

UNITED STATES PATENTS

| | | |
|---|---|---|
| 590,041 | Guild | Sept. 14, 1897 |
| 1,334,718 | Slick | Mar. 23, 1920 |
| 1,569,569 | Pels | Jan. 12, 1926 |
| 2,009,421 | Walz | July 30, 1935 |
| 2,230,839 | Hulsebos | Feb. 4, 1941 |
| 2,667,922 | Hill | Feb. 2, 1954 |
| 2,981,136 | Legge | Apr. 25, 1961 |
| 3,054,316 | Pearson | Sept. 18, 1962 |

FOREIGN PATENTS

| | | |
|---|---|---|
| 1,001,089 | Germany | Jan. 17, 1957 |
| 1,137,783 | France | Jan. 21, 1957 |
| 785,540 | Great Britain | Oct. 30, 1957 |